US012626076B2

(12) United States Patent
Gareis et al.

(10) Patent No.: US 12,626,076 B2
(45) Date of Patent: May 12, 2026

(54) SYSTEM AND METHOD FOR SCANNING PERSONS AND/OR OBJECTS

(71) Applicant: Rohde & Schwarz GmbH & Co. KG, Munich (DE)

(72) Inventors: Matthias Gareis, Nuremberg (DE); Maya Radzinski, Columbia, MD (US); Andreas Schiessl, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/925,562

(22) Filed: Oct. 24, 2024

(65) Prior Publication Data

US 2026/0119827 A1    Apr. 30, 2026

(51) Int. Cl.
*G06K 7/10* (2006.01)

(52) U.S. Cl.
CPC ............................... *G06K 7/10297* (2013.01)

(58) Field of Classification Search
CPC .................................................. G06K 7/10297
USPC ......................................................... 235/451
See application file for complete search history.

(56) References Cited

U.S. PATENT DOCUMENTS

| | | | |
|---|---|---|---|
| 6,965,340 B1 * | 11/2005 | Baharav | H01Q 21/065 342/195 |
| 8,890,684 B2 * | 11/2014 | Tkachenko | G01S 11/06 342/51 |
| 10,261,177 B2 | 4/2019 | Ahmed et al. | |
| 10,585,185 B2 | 3/2020 | Ahmed et al. | |
| 2006/0213992 A1 * | 9/2006 | Ishikawa | G07C 9/10 235/382 |
| 2011/0095892 A1 * | 4/2011 | Hong | A47F 9/04 340/572.7 |
| 2015/0253422 A1 * | 9/2015 | Morton | G01S 13/887 342/146 |
| 2019/0004170 A1 | 1/2019 | Morton et al. | |

FOREIGN PATENT DOCUMENTS

| | | |
|---|---|---|
| DE | 10 2014 210227 A1 | 7/2015 |
| EP | 3 537 186 A2 | 9/2019 |
| EP | 4224212 A1 | 8/2023 |
| WO | 2005/017559 A3 | 7/2005 |

OTHER PUBLICATIONS

The extended European search report issued by the European Patent Office on Jan. 15, 2026, which corresponds to European Patent Application No. 25192330.6-1206 and is related to U.S. Appl. No. 18/925,562.

* cited by examiner

*Primary Examiner* — Ahshik Kim
(74) *Attorney, Agent, or Firm* — Studebaker Brackett PLLC

(57) ABSTRACT

A system for scanning persons and/or objects is provided. Said system comprises at least two scan modules for transmitting and/or receiving radio frequency, RF, signals with respect to the persons and/or objects, each of said at least two scan modules comprising at least one transmit antenna and/or at least one receive antenna and/or at least one transceiver, and a crossing-through passage to be passed by the persons and/or objects, wherein the at least two scan modules are angled to allow reflections of the RF signals from at least one of the at least two scan modules to at least one other one of the at least two scan modules.

17 Claims, 9 Drawing Sheets

21b

21c

21a

21d

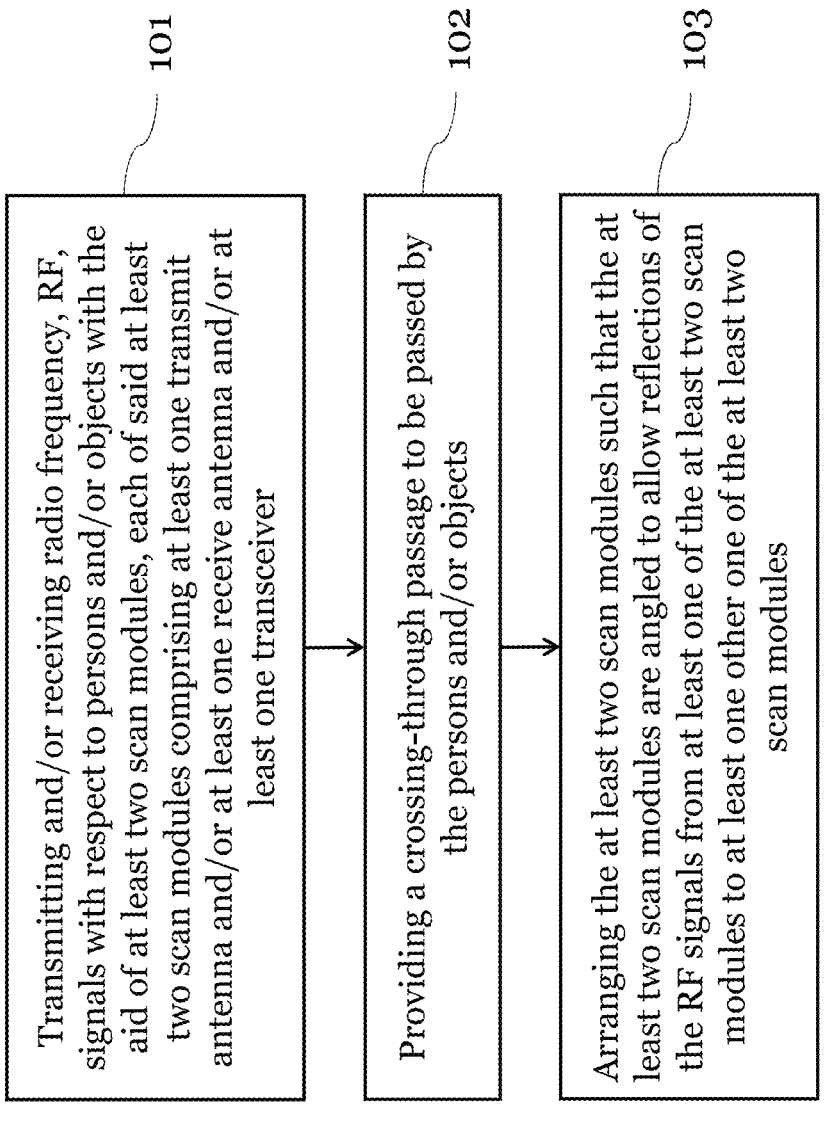

101

Transmitting and/or receiving radio frequency, RF, signals with respect to persons and/or objects with the aid of at least two scan modules, each of said at least two scan modules comprising at least one transmit antenna and/or at least one receive antenna and/or at least one transceiver

102

Providing a crossing-through passage to be passed by the persons and/or objects

103

Arranging the at least two scan modules such that the at least two scan modules are angled to allow reflections of the RF signals from at least one of the at least two scan modules to at least one other one of the at least two scan modules

Fig. 9

SYSTEM AND METHOD FOR SCANNING PERSONS AND/OR OBJECTS

TECHNICAL FIELD

The disclosure relates to a system for scanning persons and/or objects, and a method for scanning persons and/or objects.

BACKGROUND ART

In recent years, activities at public spaces like airport entrances and government buildings have significantly increased in public perception. A number of solutions for ensuring security have been suggested in the past.

For instance, U.S. Pat. No. 10,261,177 B2 relates to systems and methods for scanning objects and persons, for example, persons in security gates, by means of microwave radiation. Such a system includes an arrangement of several panels between which an angled walk-through passage is formed.

Furthermore, U.S. Pat. No. 10,585,185 B2 discloses a system for scanning a form of interest, while the form of interest is in motion. The system comprises a first detector panel-pair, comprising a first detector panel and a second detector panel, spatially offset from the first detector panel by a first continuous passageway for the motion of the form of interest. A second detector panel-pair comprises a third detector panel and a fourth detector panel, spatially offset from the third detector panel by a second continuous passageway for the motion of the form of interest, and a location-tracking device adapted to monitor the location of the form of interest.

Disadvantageously, detection performance cannot be increased in a particularly efficient manner with reduced costs.

SUMMARY

Thus, there is a need to provide an improved system and an improved method for scanning persons and/or objects, especially in the sense of an efficiently increased detection performance with reduced costs.

This is achieved by the embodiments provided in the enclosed independent claims. Advantageous implementations of the present disclosure are further defined in the dependent claims.

According to a first aspect of the present disclosure, a system for scanning persons and/or objects is provided. Said system comprises at least two scan modules for transmitting and/or receiving radio frequency, RF, signals with respect to the persons and/or objects, each of said at least two scan modules comprising at least one transmit antenna and/or at least one receive antenna and/or at least one transceiver, and a crossing-through passage to be passed by the persons and/or objects, wherein the at least two scan modules are angled to allow reflections of the RF signals from at least one of the at least two scan modules to at least one other one of the at least two scan modules.

Advantageously, detection performance can be increased in a particularly efficient manner with reduced costs. Further advantageously, not only illumination improves scan quality, but also additional channels enhance scan quality especially due to lower side lobes and lower noise.

According to an implementation form of the first aspect of the present disclosure, at least one, preferably each, of the at least two scan modules comprises or is a scan panel. In addition to this or as an alternative, at least one, preferably each, of the at least two scan modules comprises multiple transmit antennas and/or multiple receive antennas and/or multiple transceivers.

Advantageously, for instance, efficiency can be increased.

According to an implementation form of the first aspect of the present disclosure, the at least two scan modules are symmetrically angled with respect to an axis of symmetry or a center axis at an angle of more than 0 and less than 90 degrees, preferably at an angle between 30 and 70 degrees.

Advantageously, for example, scan quality or detection performance, respectively, can further be increased.

According to an implementation form of the first aspect of the present disclosure, the axis of symmetry or the center axis runs parallel or substantially parallel to the crossing-through passage. In addition to this or as an alternative, the crossing-through passage is symmetric or substantially symmetric to the axis of symmetry or the center axis.

Advantageously, for instance, complexity can be reduced, thereby increasing efficiency.

With respect to the above-mentioned term "substantially parallel", it is noted that said term may especially be understood as a deviation of not more than 30 degrees, preferably not more than 20 degrees, more preferably not more than 10 degrees, most preferably not more than 5 degrees, from parallelism.

With respect to the above-mentioned term "substantially symmetric", it is noted that said term may especially be understood as a deviation of not more than 30 percent, preferably not more than 20 percent, more preferably not more than 10 percent, most preferably not more than 5 percent, from symmetry.

According to an implementation form of the first aspect of the present disclosure, the at least two scan modules are partially or pairwise synchronized.

Advantageously, for example, detection performance can further be improved. Further advantageously, synchronization can concern time and/or frequency and/or code multiplexing.

According to an implementation form of the first aspect of the present disclosure, the system further comprises a processing unit, preferably a processor, connected to at least one, preferably each, of the at least two scan modules.

Advantageously, for instance, a scan image can be created and/or processed in a particularly efficient manner.

According to an implementation form of the first aspect of the present disclosure, the processing unit, preferably the processor, is configured to synchronize the transmitting by the at least two scan modules with the receiving by the at least two scan modules, especially with respect to a part or at least one pair or each of the at least two scan modules.

Advantageously, for example, scan quality can further be improved. Further advantageously, synchronization can concern time and/or frequency and/or code multiplexing.

According to an implementation form of the first aspect of the present disclosure, the processing unit, preferably the processor, is configured to use corresponding reflections of the RF signals from the persons and/or objects, caused by at least one of the at least two scan modules, to at least one other one of the at least two scan modules, especially to improve scan quality. In addition to this or as an alternative, the processing unit, preferably the processor, is configured to use corresponding reflections of the RF signals from the persons and/or objects, caused by at least one of the at least two scan modules, to at least one same one of the at least two scan modules.

Advantageously, for instance, detection performance can further be enhanced. Further advantageously, a reflecting body can be arranged in an area of the axis of symmetry or the center axis.

According to an implementation form of the first aspect of the present disclosure, the processing unit, preferably the processor, is configured to combine the corresponding reflections of the RF signals from the persons and/or objects, caused by the at least one of the at least two scan modules, to the at least one other one of the at least two scan modules with the corresponding reflections of the RF signals from the persons and/or objects, caused by the at least one of the at least two scan modules, to the at least one same one of the at least two scan modules.

Advantageously, for example, illumination of portions of the persons and/or objects can be obtained that are not based on direct reflections. Further advantageously, multiple persons are scannable especially at the same time.

According to an implementation form of the first aspect of the present disclosure, the processing unit, preferably the processor, is configured to obtain multiple squared channels, especially for calculating a scan image, by synchronizing the transmitting by the at least two scan modules with the receiving by the at least two scan modules.

Advantageously, for instance, detection performance or scan quality, respectively, can further be improved, which can analogously apply for the following implementation form.

According to an implementation form of the first aspect of the present disclosure, the at least two scan modules are angled with crowns. In addition to this or as an alternative, at least two of the at least two scan modules are arranged in different planes.

According to an implementation form of the first aspect of the present disclosure, the system further comprises a floor having RF mirror functionality, wherein the processing unit, preferably the processor, is configured to use the floor as mirror channels.

Advantageously, for example, at least a part of the at least two scan modules can be configured to transmit a part of the RF signals to the floor.

According to an implementation form of the first aspect of the present disclosure, the at least two scan modules comprise or are two sets of angled scan modules facing in that create a portal for the crossing-through passage.

Advantageously, for instance, complexity can be reduced, thereby increasing efficiency, which can analogously apply for the following implementation form.

According to an implementation form of the first aspect of the present disclosure, the two sets of angled scan modules form an X-geometry or an X-like geometry or a parenthesis-geometry or a parenthesis-like geometry.

According to an implementation form of the first aspect of the present disclosure, the at least two scan modules comprise or are three pairs of scan modules in an octagon or an octagon-like configuration, especially with two sides open for the crossing-through passage.

Advantageously, for example, detection performance or scan quality, respectively, can further be increased.

According to an implementation form of the first aspect of the present disclosure, at least a part or at least one pair or each of the at least two scan modules is rotatory and/or translatory movable.

Advantageously, for instance, a pair of the at least two scan modules can be used to capture one side of the respective person and/or object, then another side.

According to an implementation form of the first aspect of the present disclosure, the processing unit, preferably the processor, is configured to distinguish and/or classify the objects based on different scan scenarios with multiple objects.

Advantageously, for example, different systems with multiple objects can be used to distinguish things.

According to a second aspect of the present disclosure, a method for scanning persons and/or objects is provided. Said method comprises the steps of transmitting and/or receiving radio frequency, RF, signals with respect to the persons and/or objects with the aid of at least two scan modules, each of said at least two scan modules comprising at least one transmit antenna and/or at least one receive antenna and/or at least one transceiver, providing a crossing-through passage to be passed by the persons and/or objects, and arranging the at least two scan modules such that the at least two scan modules are angled to allow reflections of the RF signals from at least one of the at least two scan modules to at least one other one of the at least two scan modules.

Advantageously, detection performance can be increased in a particularly efficient manner with reduced costs. Further advantageously, not only illumination improves scan quality, but also additional channels enhance scan quality especially due to lower side lobes and lower noise.

According to an implementation form of the second aspect of the present disclosure, the method further comprises the step of synchronizing the transmitting by the at least two scan modules with the receiving by the at least two scan modules, especially with respect to a part or at least one pair or each of the at least two scan modules.

Advantageously, for example, scan quality can further be improved. Further advantageously, synchronization can concern time and/or frequency and/or code multiplexing.

Advantageously, for instance, detection performance can further be enhanced. Further advantageously, a reflecting body can be arranged in an area of the axis of symmetry or the center axis.

According to an implementation form of the second aspect of the present disclosure, the method further comprises the step(s) of using corresponding reflections of the RF signals from the persons and/or objects, caused by at least one of the at least two scan modules, to at least one other one of the at least two scan modules, especially to improve scan quality, and/or using corresponding reflections of the RF signals from the persons and/or objects, caused by at least one of the at least two scan modules, to at least one same one of the at least two scan modules.

Advantageously, for instance, detection performance can further be enhanced. Further advantageously, a reflecting body can be arranged in an area of the axis of symmetry or the center axis.

The above description with regard to the system according to the first aspect of the present disclosure is correspondingly valid for the method according to the second aspect of the present disclosure, and vice versa.

BRIEF DESCRIPTION OF THE DRAWINGS

The above-described aspects and implementation forms of the present disclosure will be explained in the following description of specific embodiments in relation to the enclosed drawings, in which:

FIG. 9 shows a flow chart of an embodiment of a method for scanning persons and/or objects.

DETAILED DESCRIPTIONS OF EMBODIMENTS

Figure 1:
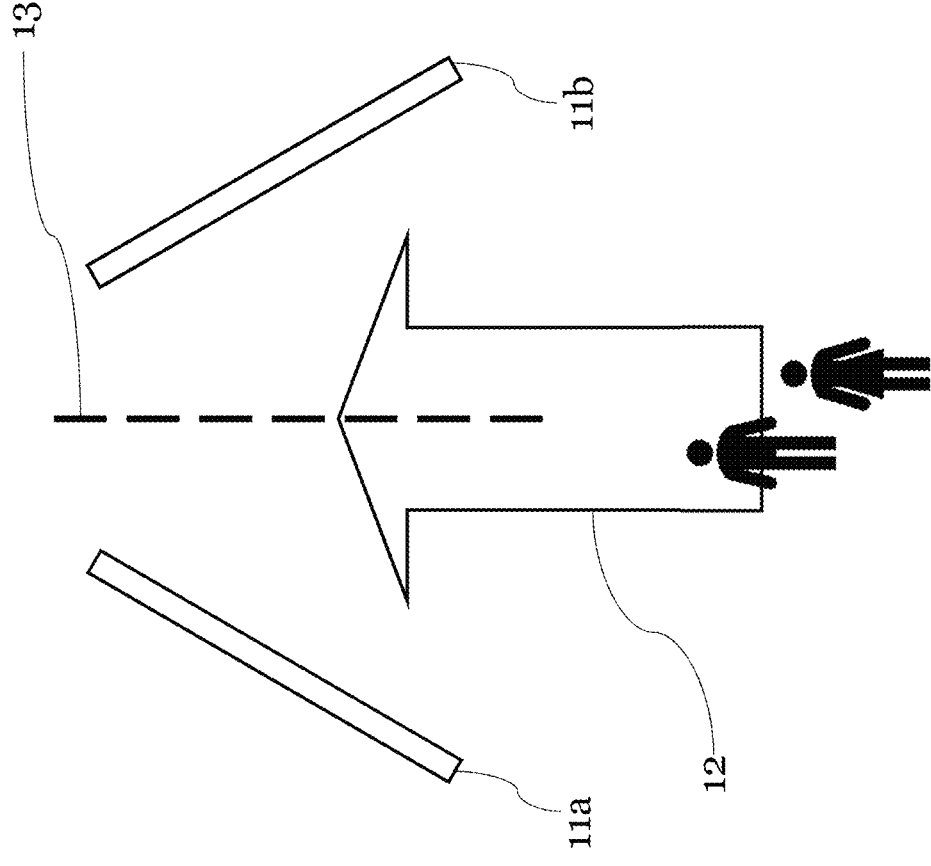
FIG. 1 shows an embodiment of a system for scanning persons and/or objects.
Figure 1:
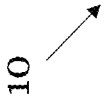

FIG. 1 illustrates an embodiment of a system 10 for scanning persons and/or objects, which comprises at least two scan modules, exemplarily two scan modules or two scan panels 11*a*, 11*b*, respectively, for transmitting and/or receiving radio frequency, RF, signals with respect to the persons and/or objects, each of said at least two scan modules or of said exemplary two scan panels 11*a*, 11*b*, respectively, comprising at least one transmit antenna and/or at least one receive antenna and/or at least one transceiver, and a crossing-through passage 12 to be passed by the persons and/or objects.

In this context, the at least two scan modules or the exemplary two scan panels 11*a*, 11*b*, respectively, are angled to allow reflections of the RF signals from at least one of the at least two scan modules to at least one other one of the at least two scan modules. In particular, scan modules or scan panels 11*a*, 11*b*, respectively, are angled to allow reflections of the RF signals, caused by the scan module or scan panel 11*a*, respectively, to the scan module or scan panel 11*b*, respectively, and/or vice versa.

With respect to the at least two scan modules or the exemplary two scan panels 11*a*, 11*b*, respectively, it is noted that it might be particularly advantageous if at least one, preferably each, of the at least two scan modules or the scan panels 11*a*, 11*b*, respectively, comprises multiple transmit antennas and/or multiple receive antennas and/or multiple transceivers.

As it can exemplarily be seen from FIG. 1, the scan modules or scan panels 11*a*, 11*b*, respectively, are symmetrically angled with respect to an axis of symmetry 13 or a center axis, respectively. Generally, it is noted that it might be particularly advantageous if the at least two scan modules are symmetrically angled with respect to an axis of symmetry or a center axis at an angle of more than 0 and less than 90 degrees, preferably at an angle between 30 and 70 degrees.

In this context, it is further noted that it might be particularly advantageous if the axis of symmetry or the center axis runs parallel or substantially parallel to the crossing-through passage. In addition to this or as an alternative, it might be particularly advantageous if the crossing-through passage is symmetric or substantially symmetric to the axis of symmetry or the center axis. In the exemplary case according to FIG. 1, the axis of symmetry 13 or the center axis, respectively, does not only run parallel to the crossing-through passage 12, but the crossing-through passage 12 is also symmetric to the axis of symmetry 13 or the center axis, respectively.

Again, with respect to the at least two scan modules or the exemplary two scan panels 11*a*, 11*b*, respectively, it is noted that it might be particularly advantageous if the at least two scan modules or the scan panels 11*a*, 11*b*, respectively, are partially or pairwise synchronized.

Figure 2:
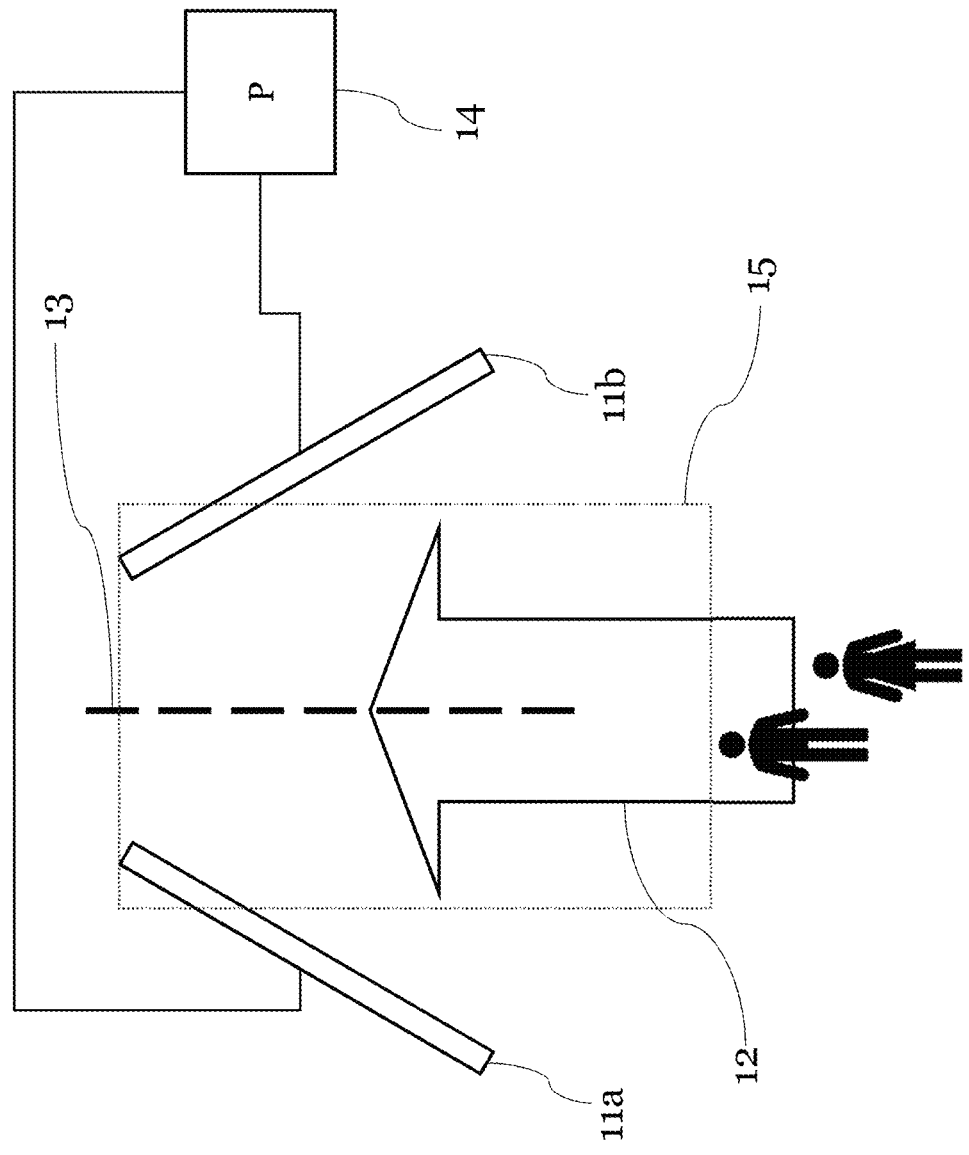
FIG. 2 shows an embodiment of a system for scanning persons and/or objects, based on the embodiment according to FIG. 1.
Figure 2:

Now, with respect to FIG. 2, an embodiment of a system 20 for scanning persons and/or objects is depicted. Said system 20 is based on the system 10 of FIG. 1 with the difference that the system 20 further comprises a processing unit or a processor 14, respectively, connected to each of the at least two scan modules or the exemplary scan panels 11*a*, 11*b*, respectively.

It is noted that it might be particularly advantageous if the processor 14 is configured to synchronize the transmitting by the at least two scan modules or by the exemplary two scan panels 11*a*, 11*b*, respectively, with the receiving by the at least two scan modules or by the exemplary scan panels 11*a*, 11*b*, respectively, especially with respect to a part or at least one pair or each of the at least two scan modules or of the exemplary two scan panels 11*a*, 11*b*, respectively.

It is further noted that it might be particularly advantageous if the processor 14 is configured to use corresponding reflections of the RF signals from the persons and/or objects, caused by at least one of the at least two scan modules or of the exemplary two scan panels 11*a*, 11*b*, respectively, to at least one other one of the at least two scan modules or of the exemplary two scan panels 11*a*, 11*b*, respectively, especially to improve scan quality. Additionally or alternatively, it might be particularly advantageous if the processor 14 is configured to use corresponding reflections of the RF signals from the persons and/or objects, caused by at least one of the at least two scan modules or of the exemplary two scan panels 11*a*, 11*b*, respectively, to at least one same one of the at least two scan modules or of the exemplary two scan panels 11*a*, 11*b*, respectively.

Moreover, it might be particularly advantageous if the processor 14 is configured to combine the corresponding reflections of the RF signals from the persons and/or objects, caused by the at least one of the at least two scan modules or of the exemplary two scan panels 11*a*, 11*b*, respectively, to the at least one other one of the at least two scan modules or of the exemplary two scan panels 11*a*, 11*b*, respectively, with the corresponding reflections of the RF signals from the persons and/or objects, caused by the at least one of the at least two scan modules or of the exemplary two scan panels 11*a*, 11*b*, respectively, to the at least one same one of the at least two scan modules or of the exemplary two scan panels 11*a*, 11*b*, respectively.

Furthermore, it is noted that it might be particularly advantageous if the processor 14 is configured to obtain multiple squared channels, especially for calculating a scan image, by synchronizing the transmitting by the at least two scan modules or by the exemplary two scan panels 11*a*, 11*b*, respectively, with the receiving by the at least two scan modules or by the exemplary two scan panels 11*a*, 11*b*, respectively.

It is further noted that it might be particularly advantageous if the at least two scan modules or the exemplary two scan panels 11*a*, 11*b*, respectively, are angled with crowns. Accordingly, the at least two scan modules or the exemplary two scan panels 11*a*, 11*b*, respectively, may especially form a crown or a vertex. In particular, at least two or at least one pair of the at least two scan modules may form a crown or a vertex. In addition to this or as an alternative, it might be particularly advantageous if at least two or at least one pair of the at least two scan modules or the exemplary two scan panels 11*a*, 11*b*, respectively, are arranged in different planes.

As it can further be seen from FIG. 2, the system 20 differs from the system 10 of FIG. 1 further in that the system 20 comprises a floor 15 having RF mirror functionality, wherein the processor 14 can be configured to use the floor 15 as mirror channels.

It is noted that it might be particularly advantageous if at least a part or at least one pair or each of the at least two scan modules or of the exemplary two scan panels 11*a*, 11*b*, respectively, is rotatory and/or translatory movable. In this context, the processor 14 may be configured to control a rotatory and/or translatory movement of at least a part or at least one pair or each of the at least two scan modules or of the exemplary two scan panels 11*a*, 11*b*, respectively.

It is further noted that it might be particularly advantageous if the processor 14 is configured to distinguish and/or classify the objects based on different scan scenarios with multiple objects. Accordingly, the processor 14 may especially be configured to have access to such different scan scenarios. For instance, the system 20 and/or the processor 14 may comprise a memory for storing such different scan scenarios. Further exemplarily, the system 20 may be in communication with at least one further system for scanning persons and/or objects to obtain such different scan scenarios.

Now, with respect to FIG. 3 to FIG. 8, different arrangements of scan modules or scan panels 21*a*, 21*b*, 21*c*, 21*d*, 21*e*, 21*f*, respectively, are depicted, which can be applied to the above-mentioned system 10 according to FIG. 1 or to the above-mentioned system 20 according to FIG. 2, respectively.

Figure 3:
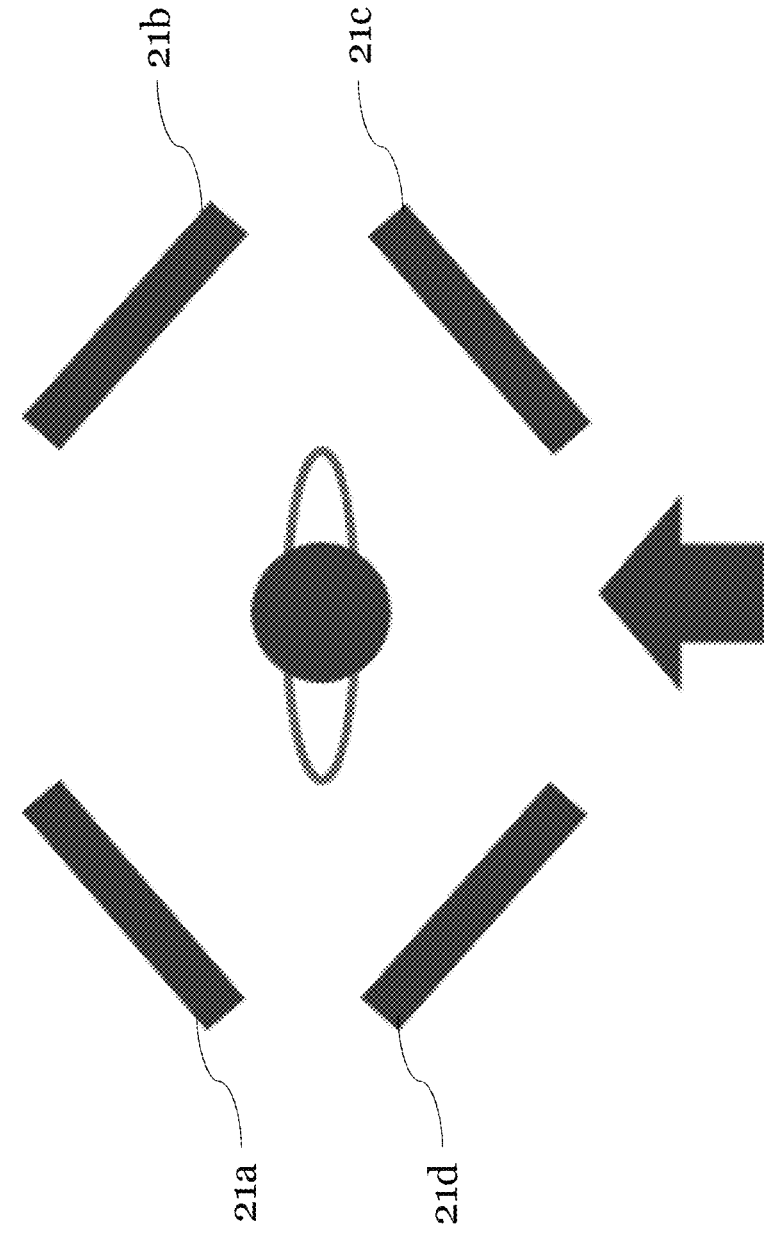
FIG. 3 shows an exemplary arrangement of scan modules or scan panels, respectively.
Figure 4:
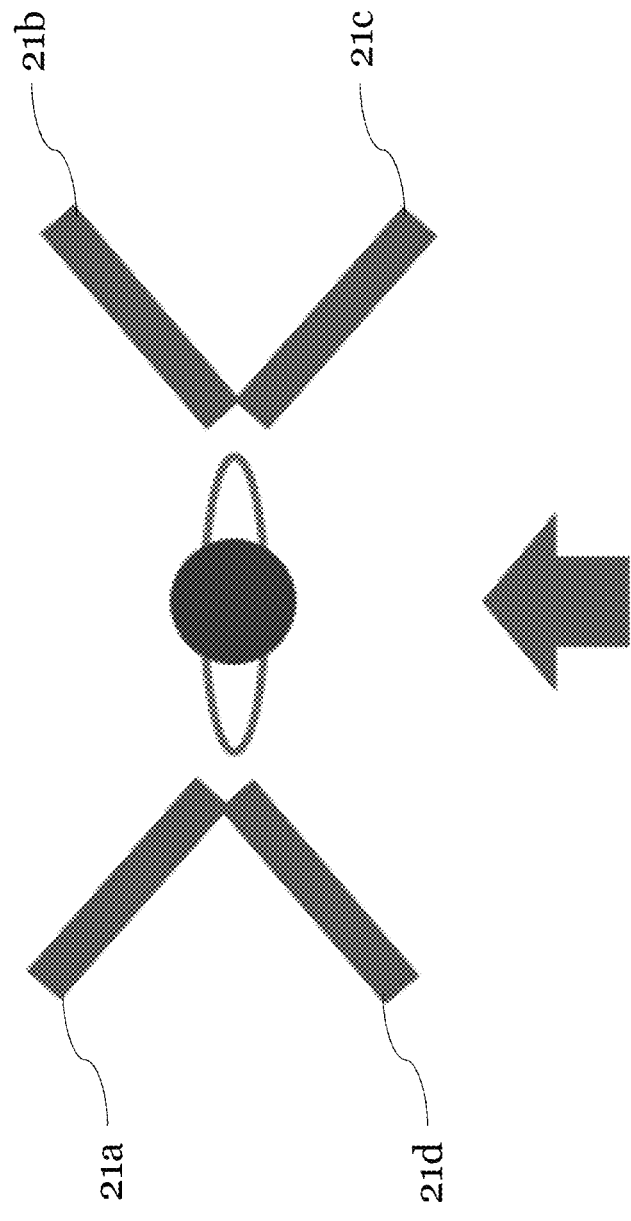
FIG. 4 shows a further exemplary arrangement of scan modules or scan panels, respectively.
Figure 5:
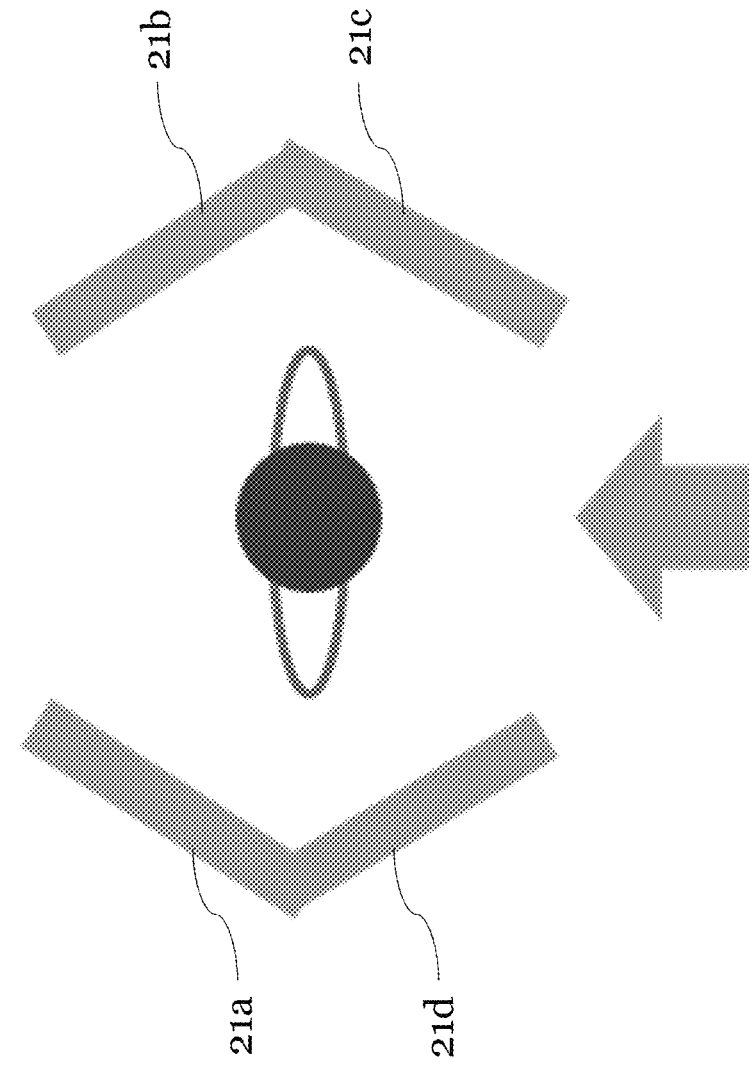
FIG. 5 shows a further exemplary arrangement of scan modules or scan panels, respectively.
Figure 6:
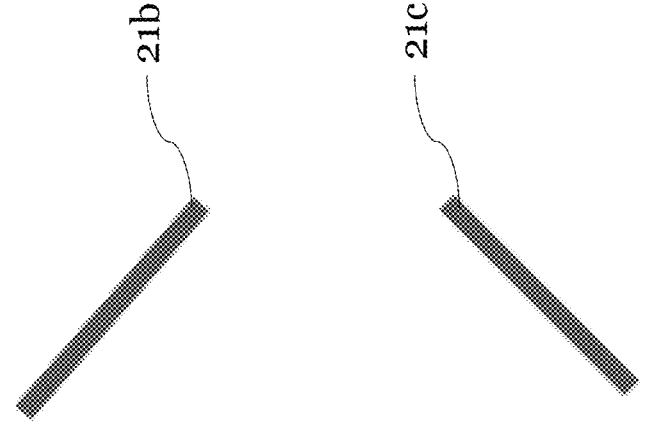
FIG. 6 shows a further exemplary arrangement of scan modules or scan panels, respectively.
Figure 6:
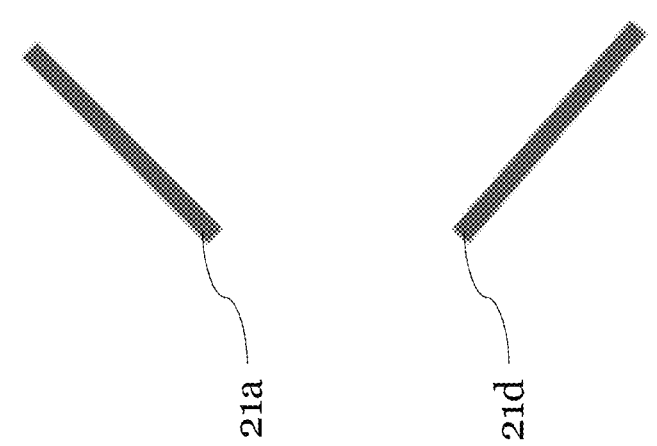

In accordance with each of the FIG. 3 to FIG. 8, it can be seen that it might be particularly advantageous if the at least two scan modules, exemplarily the four scan panels 21*a*, 21*b*, 21*c*, 21*d* or the six scan panels 21*a*, 21*b*, 21*c*, 21*d*, 21*e*, 21*f*, respectively, comprise or are two sets of angled scan modules facing in that create a portal for the crossing-through passage. In the case of FIG. 4, FIG. 5, FIG. 7, and FIG. 8, said crossing-through passage exemplarily runs vertically. In the case of FIG. 3 and FIG. 6, said crossing-through passage can exemplarily run vertically or horizontally.

As it can exemplarily be seen from FIG. 4, the two sets of angled scan modules, exemplarily the scan panels 21*a*, 21*b*, 21*c*, 21*d*, form an X-geometry or an X-like geometry, respectively. For instance, in the case of FIG. 4, the scan panels 21*a*, 21*b*, 21*c*, 21*d* form a vertically halved X. In this context, the scan panels 21*a* and 21*d* form a corresponding first half, and the scan panels 21*b* and 21*c* form a corresponding second half.

Figure 8:
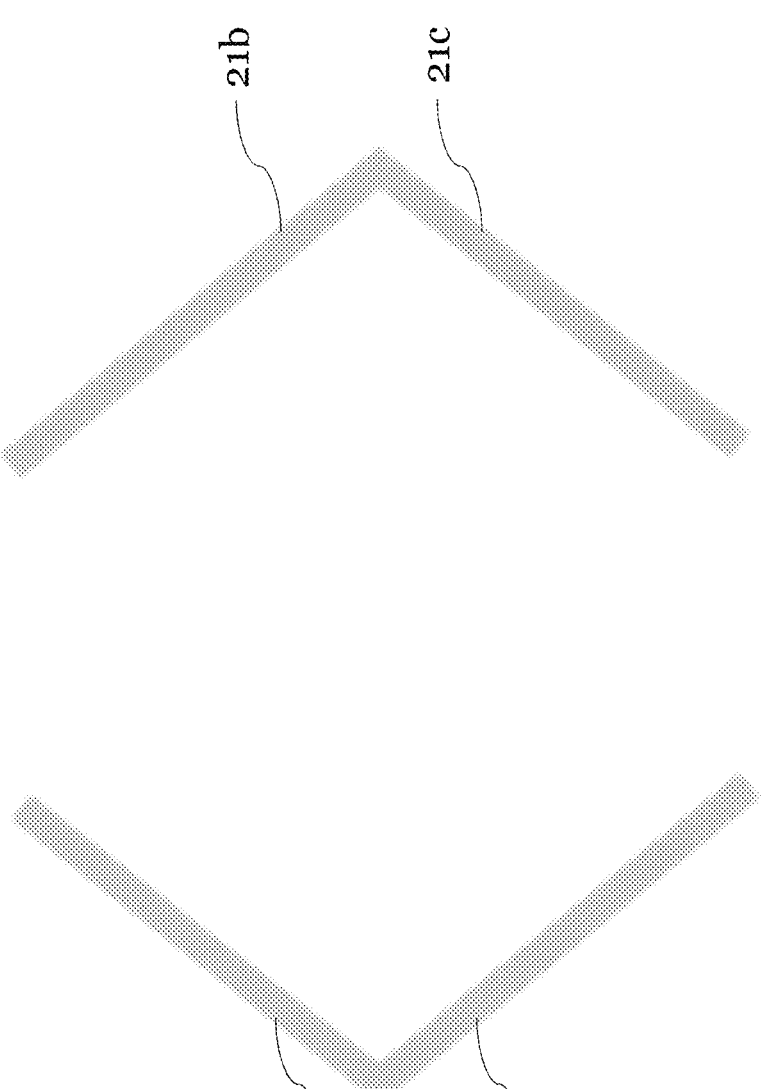
FIG. 8 shows a further exemplary arrangement of scan modules or scan panels, respectively.

Moreover, as it can exemplarily be seen from FIG. 5 or FIG. 8, respectively, the two sets of angled scan modules, exemplarily the scan panels 21*a*, 21*b*, 21*c*, 21*d*, form a parenthesis-geometry or a parenthesis-like geometry. For example, in the case of FIG. 5 or FIG. 8, respectively, the scan panels 21*a* and 21*d* form a first angle bracket, especially an opened angle bracket, and the scan panels 21*b* and 21*c* form a second angle bracket, especially a closed angle bracket.

Figure 7:
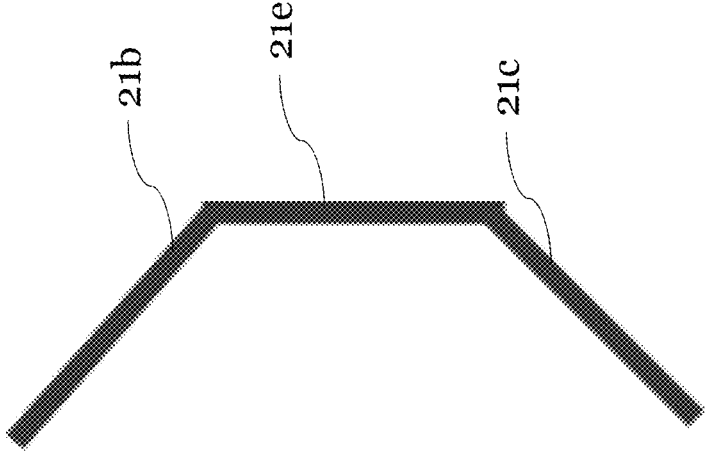
FIG. 7 shows a further exemplary arrangement of scan modules or scan panels, respectively.
Figure 7:
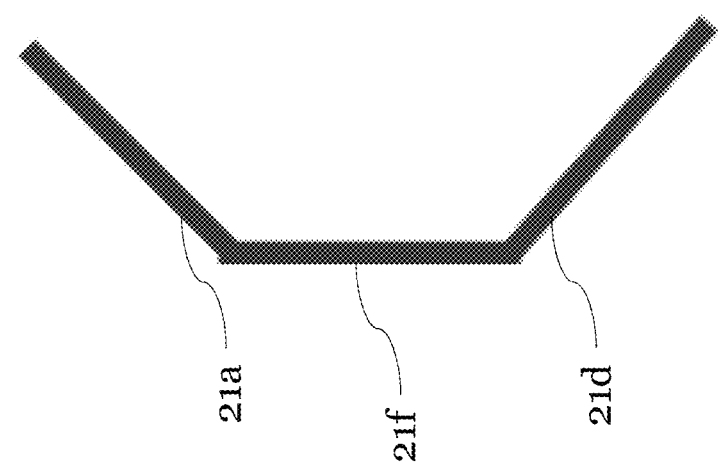

As it can exemplarily be seen from FIG. 7, it is noted that it might be particularly advantageous if the at least two scan modules comprise or are three pairs of scan modules, exemplarily the scan panels 21*a*, 21*b*, 21*c*, 21*d*, 21*e*, 21*f*, in an octagon or an octagon-like configuration, especially with two sides open for the crossing-through passage. For instance, in the case of said FIG. 7, each of the three pairs of scan modules or scan panels, respectively, comprises two scan modules or two scan panels, respectively, arranged in a parallel manner. Exemplarily, scan panels 21*a* and 21*c* are a pair of parallel scan panels, scan panels 21*b* and 21*d* are a pair of parallel scan panels, and scan panels 21*e* and 21*f* are a pair of parallel scan panels.

For the sake of completeness, with respect to FIG. 3 to FIG. 8, it is noted that each of FIG. 3 to FIG. 5 comprises an object passing the respective crossing-through passage, whereas each of FIG. 6 to FIG. 8 is exemplarily free of persons and objects to be scanned.

Finally, FIG. 9 illustrates a flow chart of an embodiment of a method for scanning persons and/or objects. In accordance with said FIG. 9, a first step 101 comprises transmitting and/or receiving radio frequency, RF, signals with respect to the persons and/or objects with the aid of at least two scan modules, such as the above-mentioned scan modules or scan panels 11*a*, 11*b*, 21*a*, 21*b*, 21*c*, 21*d*, 21*e*, 21*f*, respectively, each of said at least two scan modules comprising at least one transmit antenna and/or at least one receive antenna and/or at least one transceiver. A second step 102 comprises providing a crossing-through passage to be passed by the persons and/or objects. A third step 103 comprises arranging the at least two scan modules such that the at least two scan modules are angled to allow reflections of the RF signals from at least one of the at least two scan modules to at least one other one of the at least two scan modules. It is noted that the order of the steps 101, 102, 103 may be rearranged in a different way.

Furthermore, it might be particularly advantageous if the method further comprises the step of synchronizing the transmitting by the at least two scan modules with the receiving by the at least two scan modules, especially with respect to a part or at least one pair or each of the at least two scan modules.

Moreover, it might be particularly advantageous if the method further comprises the step(s) of using corresponding reflections of the RF signals from the persons and/or objects, caused by at least one of the at least two scan modules, to at least one other one of the at least two scan modules, especially to improve scan quality, and/or using corresponding reflections of the RF signals from the persons and/or objects, caused by at least one of the at least two scan modules, to at least one same one of the at least two scan modules.

All features described above or features shown in the figures can be combined with each other in any advantageous manner within the scope of the disclosure.

What is claimed is:

1. A system for scanning persons and/or objects, comprising:

at least two scan modules for transmitting and/or receiving radio frequency (RF) signals with respect to the persons and/or objects, each of said at least two scan modules comprising at least one transmit antenna and/or at least one receive antenna and/or at least one transceiver, a crossing-through passage to be passed by the persons and/or objects, and a processing unit connected to the at least two scan modules, wherein the at least two scan modules are angled to allow reflections of the RF signals from at least one of the at least two scan modules to at least one other one of the at least two scan modules, wherein the at least two scan modules are partially or pairwise synchronized, and wherein synchronization concerns code multiplexing.

2. The system according to claim 1, wherein at least one of the at least two scan modules comprises or is a scan panel, or wherein at least one of the at least two scan modules comprises multiple transmit antennas and/or multiple receive antennas and/or multiple transceivers.

3. The system according to claim 1, wherein the at least two scan modules are symmetrically angled with respect to an axis of symmetry or a center axis at an angle of more than 0 and less than 90 degrees or at an angle between 30 and 70 degrees.

4. The system according to claim 3, wherein the axis of symmetry or the center axis runs parallel or substantially parallel to the crossing-through passage, or wherein the crossing-through passage is symmetric or substantially symmetric to the axis of symmetry or the center axis.

5. The system according to claim 1, wherein the processing unit is configured to synchronize the transmitting by the at least two scan modules with the receiving by the at least two scan modules, especially with respect to a part or at least one pair or each of the at least two scan modules.

6. The system according to claim 1, wherein the processing unit is configured to use corresponding reflections of the RF signals from the persons and/or objects, caused by at least one of the at least two scan modules, to at least one other one of the at least two scan modules, especially to improve scan quality, or wherein the processing unit is configured to use corresponding reflections of the RF signals from the persons and/or objects, caused by at least one of the at least two scan modules, to at least one same one of the at least two scan modules.

7. The system according to claim 6, wherein the processing unit is configured to combine the corresponding reflections of the RF signals from the persons and/or objects, caused by the at least one of the at least two scan modules, to the at least one other one of the at least two scan modules with the corresponding reflections of the RF signals from the persons and/or objects, caused by the at least one of the at least two scan modules, to the at least one same one of the at least two scan modules.

8. The system according to claim 5, wherein the processing unit is configured to obtain multiple squared channels, especially for calculating a scan image, by synchronizing the transmitting by the at least two scan modules with the receiving by the at least two scan modules.

9. The system according to claim 1, wherein the at least two scan modules are angled with crowns, or wherein at least two of the at least two scan modules are arranged in different planes.

10. The system according to claim 1, wherein the system further comprises a floor having RF mirror functionality, and wherein the processing unit is configured to use the floor as mirror channels.

11. The system according to claim 1, wherein the at least two scan modules comprise or are two sets of angled scan modules facing in that create a portal for the crossing-through passage.

12. The system according to claim 11, wherein the two sets of angled scan modules form an X-geometry or an X-like geometry or a parenthesis-geometry or a parenthesis-like geometry.

13. The system according to claim 1, wherein the at least two scan modules comprise or are three pairs of scan modules in an octagon or an octagon-like configuration, especially with two sides open for the crossing-through passage.

14. The system according to claim 1, wherein at least a part or at least one pair or each of the at least two scan modules is rotatory and/or translatory movable.

15. The system according to claim 1, wherein the processing unit is configured to distinguish and/or classify the objects based on different scan scenarios with multiple objects.

16. A method for scanning persons and/or objects, comprising the steps of:

transmitting and/or receiving radio frequency (RF) signals with respect to the persons and/or objects with the aid of at least two scan modules, each of said at least two scan modules comprising at least one transmit antenna and/or at least one receive antenna and/or at least one transceiver, providing a crossing-through passage to be passed by the persons and/or objects, arranging the at least two scan modules such that the at least two scan modules are angled to allow reflections of the RF signals from at least one of the at least two scan modules to at least one other one of the at least two scan modules, and a processing unit synchronizing the transmitting by the at least two scan modules with the receiving by the at least two scan modules, especially with respect to at least one pair or the at least two scan modules, wherein synchronization concerns code multiplexing.

17. The method according to claim 16, wherein the method further comprises the step(s) of:

using corresponding reflections of the RF signals from the persons and/or objects, caused by at least one of the at least two scan modules, to at least one other one of the at least two scan modules, especially to improve scan quality, or using corresponding reflections of the RF signals from the persons and/or objects, caused by at least one of the at least two scan modules, to at least one same one of the at least two scan modules.

* * * * *